(12) United States Patent
Lindstrom et al.

(10) Patent No.: US 7,250,183 B2
(45) Date of Patent: Jul. 31, 2007

(54) CREAM CHEESE MADE FROM WHEY PROTEIN POLYMERS

(75) Inventors: Ted Riley Lindstrom, Lake Forest, IL (US); Amanda Dees Mehring, New Bern, NC (US); Heather Michelle Hudson, Rolling Meadows, IL (US)

(73) Assignee: Kraft Foods Holdings, Inc., Northfield, IL (US)

( * ) Notice: Subject to any disclaimer, the term of this patent is extended or adjusted under 35 U.S.C. 154(b) by 510 days.

(21) Appl. No.: 10/748,626

(22) Filed: Dec. 30, 2003

(65) Prior Publication Data

US 2005/0142251 A1    Jun. 30, 2005

(51) Int. Cl.
*A23C 9/12* (2006.01)

(52) U.S. Cl. .......................... 426/36; 426/34; 426/582; 426/519; 426/520

(58) Field of Classification Search .................. 426/34, 426/36, 38, 40, 580, 582, 519, 520, 521, 426/522
See application file for complete search history.

(56) References Cited

U.S. PATENT DOCUMENTS

| 4,253,386 A | 3/1981 | Egnell |
|---|---|---|
| 4,885,183 A | 12/1989 | Strandholm et al. |
| 5,416,196 A | 5/1995 | Kitabatake et al. |
| 6,139,900 A | 10/2000 | Foegeding et al. |
| 6,419,975 B1 | 7/2002 | Han et al. |
| 2004/0219273 A1 | 11/2004 | Cha et al. |

FOREIGN PATENT DOCUMENTS

| EP | 0129346 | 12/1984 |
|---|---|---|
| GB | 1282502 | 7/1972 |
| GB | 1575052 | 5/1977 |
| GB | 2063273 | 11/1980 |
| GB | 2324236 | 10/1998 |

OTHER PUBLICATIONS

Vardhanabhuti et al., J.Agric. Food Chem. (1999), 47, 3649-3655.
Watanabe et al., Journal of Dairy Research (1976), 43, 411-418.
Jelen et al., "Utilitization of Cottage Cheese Whey in Processed-Cheese-Like Dairy Spreads", *Egyptian J. Dairy Sci.*, vol. 9, No. 2, 1981, pp. 159-170.

*Primary Examiner*—Leslie Wong
(74) *Attorney, Agent, or Firm*—Fitch, Even, Tabin & Flannery

(57) ABSTRACT

This invention relates to a cheese product and a novel method for preparing a cheese product. More specifically, this invention relates to cream cheese product prepared using an edible fat and polymerized whey protein, as a protein source, obtainable from a whey protein concentrate. A cream cheese product prepared according to the present method exhibits an unexpected increase in firmness and has excellent syneresis properties.

18 Claims, 1 Drawing Sheet

CREAM CHEESE MADE FROM WHEY PROTEIN POLYMERS

FIELD OF THE INVENTION

This invention relates to a cheese-like product and a novel method for preparing such a product. More specifically, this invention relates to a cream cheese product that is substantially casein-free prepared using an edible fat and a non-casein protein source comprising a polymerized whey protein from a whey protein concentrate. The cream cheese product prepared according to the present method exhibits an unexpected increase in firmness and has excellent syneresis properties.

BACKGROUND OF THE INVENTION

Cheese compositions are generally prepared from dairy liquids by processes that include treating the liquid with a coagulating or clotting agent. The coagulating agent may be a curding enzyme, an acid, a suitable bacterial culture, or an agent including a culture. The coagulum or curd that results generally incorporates casein that has been suitably altered by the curding process, fats including natural butter fat, and flavorings arising during the processing (especially when using a bacterial culture as the coagulating agent). The curd is usually separated from the whey. The resulting liquid whey generally contains soluble proteins not affected by the coagulation; such proteins are, of course, not incorporated into the coagulum because they are solubilized in the liquid whey.

Nevertheless, whey proteins have high nutritive value for humans. In fact, the amino acid composition in whey proteins is close to an ideal composition profile for human nutrition. Whey proteins are also understood to have superior emulsifying capabilities in comparison with casein. Without wishing to be bound by theory, this should reduce defects such as phase separation during processing, and, in the case of cream cheese, can also provide a smoother creamier product. In addition, such whey proteins provide a low cost dairy product which, if successfully incorporated into cheese products, would significantly increase the overall efficiency and effectiveness of the cheese-making process.

Cream cheese products are produced on large scale in the United States and ways to improve the product and to produce it in a more economical manner have been long sought in the dairy and food industry.

Unfortunately, methods or attempts to incorporate or use whey protein in cheese products have generally been unsuccessful. For example, whey proteins have been concentrated or dried from whey and then recombined with cheese (see, e.g., Kosikowski, Cheese and Fermented Foods, 2nd ed., Edwards Brothers, Inc., Ann Arbor, Mich., 1977, pp. 451-458). The whey proteins recovered from such procedures, however, do not have the appropriate or desired physical and chemical properties required for good, high quality natural cheeses or process cheeses.

Still other numerous attempts have tried various forms of modified native whey protein, modified, expensive whey protein isolate, or even cellular sources. For instance, a process for improving the functional properties of a protein-containing material selected from the group consisting of single-cell protein material, plant protein material, and mixtures of single-cell protein with plant material, whey solids or both plant protein and whey solids, in which the mixtures contain 1 to 99 weight percent of the single-cell protein is described in U.K. Patent 1,575,052. An aqueous slurry of the specified protein-containing material having 1 to 99 percent of the single cell protein is heated to a temperature of 75 to 100° C., the pH is adjusted to within the range of 6.6 to 8.0 by adding a compound selected from the group consisting of anhydrous ammonia, ammonium hydroxide, calcium hydroxide, sodium hydroxide, sodium bicarbonate, calcium sulfate, potassium carbonate, calcium carbonate, sodium carbonate, potassium hydroxide, magnesium hydroxide and mixtures thereof, maintaining the heated, pH-adjusted slurry under such conditions for 1 to 120 minutes, and then drying the material. The products are described as being capable of replacing nonfat dry milk in formulations which include bakery goods.

According to Watanabe et al., *J. Dairy Res.*, 43:411 (1976), intermolecular disulfide bonds are formed when β-lactoglobulin is heated, with a maximum amount of such bonds being formed at pH 7.0. The β-lactoglobulin is the major protein component in whey and the covalent disulfide bonds link together individual proteins to form extended polymers. Larger sized aggregates are formed at 75° C. and smaller sized aggregates form at 97° C.

U.K. Patent Application 2,063,273A (Jun. 3, 1981) describes a method of preparing soluble denatured whey protein compositions that involves raising the pH of an aqueous solution of native whey protein to a pH of more than 6.5 and then heating the solution at a temperature and for a time greater than that at which the native whey protein is denatured and mentioned yogurt and salad dressing.

U.S. Pat. No. 5,416,196 to Kitabatake et al. describes a method of producing a transparent, purified milk whey protein having a salt concentration of less than 50 millimoles/liter. Using this purified whey protein in solution, Kitabatake et al. produced a whey protein product by adjusting the pH of the solution, readjusting the pH to either below 4 or above 6, and again heating the solution. This patent describes the use of whey protein from which the salts and saccharides normally contained in whey are substantially removed, for example by dialysis, chromatography, or microfiltration. While salt maybe re-added to the whey solution during processing for flavoring, this is done after adjusting the pH.

A heat treatment described in Hoffman, *J. Dairy Res.*, 63:423-440 (1996) reportedly concerned formation of very large β-lactoglobulin aggregates at pH≦6.4.

Rheological properties and characterization of polymerized whey isolates are described in Vardhanabhuti et al., *J. Agric. Food Chem.*, 47:3649-3655 (1999). The whey isolate was heat denatured and polymerized to produce soluble polymers. Whey isolate solutions in deionized water were prepared at concentrations of 8, 10, and 11 percent and heated in a water bath for 1, 3, and 9 hours at unspecified pH.

Gelation properties of polymerized whey protein isolates are described in Vardhanabhuti et al., Abstract 6-9, IFT Annual Meeting (1999). Whey polymers are described as being produced by heating a pH adjusted (pH 7.0) 11 percent protein solution of whey protein isolate (WPI) at selected salt concentrations of 10 mM $CaCl_2$ and 200 mM NaCl.

U.S. Pat. No. 6,139,900 (Oct. 31, 2000) provides a complex, multi-heating step process for producing whey protein dispersions involving heating a 2 percent solution of whey protein isolate having a pH of at least 8.0 to 75° C. in a first heating step, cooling it, adjusting the pH to less than about 8.0 (e.g., 7.0), and heating the solution in a second heating step at a temperature of 75 to 97° C. to produce a polymerized whey protein product. This is a relatively complex, multi-step process that requires expensive starting materials and is relatively energy inefficient.

Whey protein isolate, which is required in the process of U.S. Pat. No. 6,139,900, is a highly purified and expensive product. Conventionally, whey protein isolate is made by drying and removing non-protein constituents from pasteurized whey so that the finished product contains more than 81 percent protein, typically greater than 90 percent, such as on the order of 98 percent protein. The highly purified whey protein isolate may contain small amounts of fat and lactose. Removing non-protein constituents can be achieved using physical separation techniques such as precipitation, filtration, or dialysis. The acidity of the final isolate product can be adjusted.

Whey protein concentrate (WPC) is more cost-effective than whey protein isolate (WPI) and can be easily produced on a much larger scale. It has a higher lactose but a lower protein content than whey protein isolate. It would be a significant advance in the art if WPC could be recovered from unit operations in an easy, reliably, economically, and energy efficient manner for use in the manufacture of dairy products, such as cream cheese type products.

SUMMARY OF THE INVENTION

The present invention provides an economical method for producing cream cheese products (e.g., cream cheese spreads and the like), in which a polymerized whey protein from a single-heat treatment of a suitable whey protein concentrate source, can replace casein protein.

The present method avoids the cumbersome and expensive treatments that are required when single cell organisms are used as a protein source in a foodstuff.

In one embodiment, the method provides for at least reducing the content of casein-containing dairy liquids in the process for making cream cheese, and in the resulting cream cheese product. This reduction is attainable by incorporating a thermally modified and functionally enhanced polymerized whey protein to displace the functionality of the casein that has been eliminated.

Another embodiment of the present method involves the heat treating an aqueous suspension, emulsion, or solution of WPC at about 70 to about 105° C. (preferably at about 80 to 85° C.) for about 0.5 to about 180 minutes (preferably about 15 to about 45 minutes), wherein the aqueous suspension, emulsion, or solution has a mildly alkaline pH; admixing thereto an edible fat source to obtain an admixture; heating and homogenizing the admixture; pasteurizing the homogenized admixture; cooling the admixture; fermenting the cooled admixture with a culture suitable for a cheese, such as a cream cheese; admixing thereto at least one stabilizer and salt and cooking; homogenizing the cooked admixture; and collecting the product. The collected product can be cooled and, if desired, packaged.

DETAILED DESCRIPTION OF THE INVENTION

Figure 1:
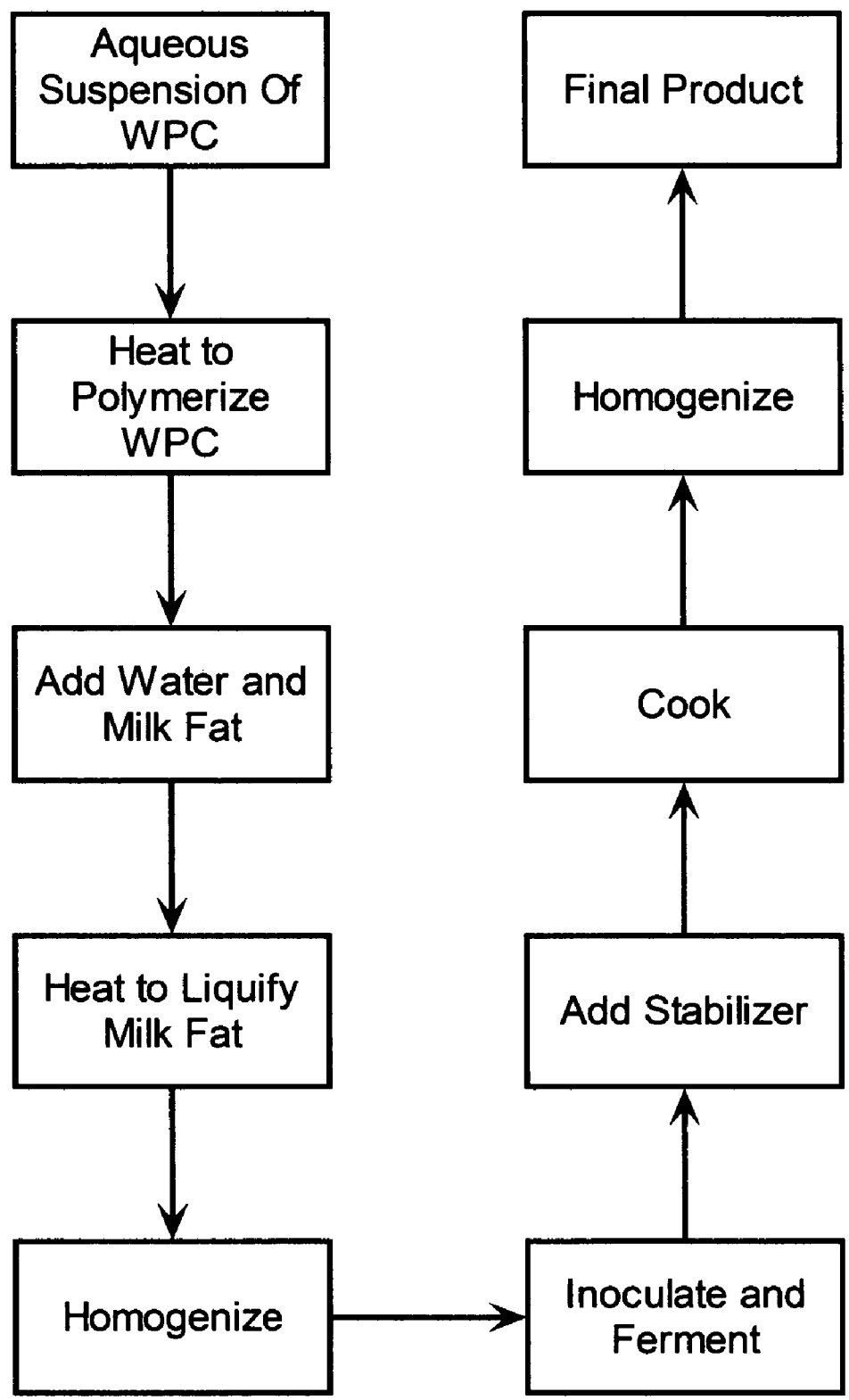
FIG. 1 illustrates one embodiment of the method of the present invention.

The present method involves producing a cream cheese type product that contains significantly reduced levels of casein and preferably that contains essentially no casein. For purposes of this invention, "significantly reduced levels of casein" or equivalent phrases are intended to mean that the cream cheese type product contains less than about 2 percent casein, and preferably less than about 1 percent casein. For purposes of this invention, a cream cheese type product which contains "essentially no casein" is intended to mean that it contains less than about 0.5 percent casein. Typically, conventional cheese type products contain about 5 to about 10 percent casein. More preferably, the protein source in the present method constitutes polymerized whey protein from a thermally induced polymerization of at least one whey protein concentrate. The thermal induced polymerization is advantageously carried out in a single polymerization step.

This present invention provides processes for making a stable cheese product supplemented with functionally enhanced, polymerized whey protein. As used herein, the term "stable" as applied to the resulting cheese product relates to characteristics such as the product having minimal syneresis, an unexpectedly improvement in firmness (which can be measured as yield strength), and minimal disruption of the emulsion during processing. As used herein, the term "functionally enhanced" and similar expressions relate to an alteration in the structure and properties of the polymerized whey proteins.

Whey proteins have high nutritive value for humans, and can provide a favorable sensory quality, conferring a creamy and spreadable quality to dairy products in which they are incorporated. Whey proteins also can enhance cheesecake baking performance, when added to a cream cheese product, especially in cheesecake formulations with low protein content. In addition, their cost is low, compared to the other proteins present in milk, making it desirable to incorporate whey proteins into cheese products. The present method overcomes the difficulties previously encountered in dairy production in which attempts to incorporate whey proteins into cheese, such as cream cheese products, have led to excessive separation losses (syneresis) and concomitant decreases in yield and/or to very poor firmness of the finished product.

A cream cheese product can be prepared by inoculating a homogenized and pasteurized mixture of at least a portion of the mixture containing the polymerized whey protein polymers obtained from WPC, water, and an edible fat with a suitable lactic culture and fermenting it under conditions to aid in acid production; admixing at least one additive selected from the group consisting of salt and stabilizer (e.g., edible gum such as carob gum, tara gum, guar gum, carrageenan, alginate, and xanthan gum; maltodextrin; starches; and the like); cooking the admixture; and homogenizing the product before packaging. In principle, the at least one salt and stabilizer can be added as the temperature is being raised to the cooking temperature, provided there is sufficient mixing of ingredients. The homogenized admixture can be cooled before packaging for bulk shipment or packaging in containers for direct sale to consumers, or collected under conditions effective to collect the product in a brick form.

The present method initially involves producing a polymerized whey protein from at least one WPC in a single heat treatment. An exemplary methodology includes preparing an aqueous suspension of at least one WPC; optionally adjusting the pH of the aqueous suspension to a mildly alkaline pH; heating the aqueous suspension to a temperature and for a time sufficient to form polymerized whey proteins in a mixture; and optionally cooling the thus obtained mixture.

Whey protein concentrate (WPC) is significantly different from a whey protein isolate (WPI). WPC is generally a white to light cream colored product with a bland but clean flavor. Although non-protein constituents can be removed, the protein concentration is generally about 10 to about 80 percent, and more usually about 25 to about 75 percent. WPC alsohas a higher concentration of fat and lactose than whey protein isolate. The higher lactose concentration means there is increased shielding for the whey proteins against denaturation. Industrially, concentrating the whey can be achieved by ultrafiltration, where low molecular weight compounds are filtered from the whey to a permeate, with the proteins being concentrated in the retentate, from which the WPC can be obtained. The permeate can be used in cattle feed, to manufacture certain pharmaceutical products, and in producing lactose.

The WPC can, for instance, be selected from the group consisting of dry whey protein concentrate, liquid whey protein concentrate and any combination thereof. Generally, WPCs having a protein concentration of about 25 to about 85 percent are used in the present method. Commercially available WPC having about 34, 50, or 70 percent protein are especially preferred. Powdered concentrated whey, known in the trade as "WPC" (whey protein concentrate), which is available in grades having protein concentrations (dry basis) of about 34, 50, 70, and up to less than about 80 percent can also be sued. Other commercially available WPC (e.g., "FDA 50" (a WPC containing about 50 percent protein), WPC 8000 (a WPC containing 80 percent protein)) can also be used. These WPC concentrations are with respect to WPC in powder form. It would be advantageous to use a WPC that is commercially available and processible on currently used equipment.

A general method of preparing cream cheese according to the present invention is illustrated in FIG. 1. In the present method, the aqueous suspension (solution, dispersion etc.) of whey protein concentrate is provided in which the protein concentration is selected to enable facile and reliable processing. The protein concentration in the aqueous WPC suspension is generally on the order of about 4 to about 20 percent protein, although protein concentrations of about 5 to about 8 percent protein may be preferred. If the protein concentration in the aqueous media is too low (generally less than about 1 percent) the polymerization may proceed too slowly, whereas if the concentration is too high (generally greater than about 20 percent), the "polymerized" material obtained may be undesirable (i.e., lack the desired functionality). Generally, protein concentrations less than about 8 percent protein are preferred since higher levels can result in the formation of curd-like materials. If broken up (using, for example, a shear device), such curd-like materials may be used, if desired.

The pH of the aqueous suspension may be adjusted, if desired or as needed, to a mildly alkaline level (generally greater than about 7 up to about 9) by addition of an edible base (e.g., NaOH, KOH, and the like). Preferably the pH is adjusted to about 7 to about 8, and more preferably to about 7.2 to about 7.5.

This aqueous solution is heated in a single heat treatment to a temperature and for such time as desired to induce thermal polymerization of the whey protein from the WPC. Generally, sufficient thermal polymerization of the whey protein is that degree of polymerization that will provide a yield stress value of greater than about 2500 Pascals in the final cream cheese product. The actual time and temperature may vary as a function of the equipment used and on the pH of the starting WPC. In general, the WPC can be heated to a temperature ranging from about 70 to about 105° C. (preferably about 80 to about 85° C.) for about 0.5 to about 180 minutes (preferably for about 15 to about 45 minutes). In principle, the heating step can, if desired, be conducted at elevated pressures, such as in a heated extruder, in which case the temperature can be suitably adjusted. Multiple heat treatments to induce thermal polymerization are inefficient and waste energy, both of which undesirably increase the costs to make the product. Thus, the present invention only requires, and specially does not include, multiple (i.e., two or more) heat treatment steps for thermal polymerization. The polymerized whey protein can, if desired, be cooled to about ambient temperature.

The whey protein polymers result from unfolded proteins cross linking by —S—S— bonding. In general, the consequent increase in molecular weight indicates increased crosslinking with a whey protein. In principle, about 30 to about 85 percent disulfide crosslinking may be attainable in the present method, although crosslinking in a range of about 50 to about 80 percent is generally preferred. The degree of crosslinking can be estimated, for example, using polyacrylamide gel electrophoresis with disulfide reducing reagents such as dithiothreitol (see, e.g., U.S. Pat. No. 4,885,183 and Laemmi, *Nature*, 227:680-685 (1970), both of which are incorporated by reference).

The use of polymerized whey protein from a single controlled heat treatment of an aqueous media including WPC saves energy, reduces overall processing time, and allows for a decrease in fat content, provides satisfactory moisture levels in the cream cheese product without sacrificing product quality and while employing a by-product of conventional cream cheese manufacture. The cost to produce a cream cheese product can thus be considerably reduced. A mixture of the product comprising the polymerized whey protein (oftentimes characterized as a suspension, although it may also be deemed an emulsion or solution; these terms are used interchangeably in the present specification) from the WPC concentrate along with a selected amount of edible fat, such as milkfat (preferably anhydrous milk fat), and water are mixed to form an essentially homogeneous mixture or slurry. A selected source of edible fat includes dairy fat, natural and partially hydrogenated edible oil, and the like as well as mixtures thereof. Non-dairy fats, such as vegetable, animal fats or oils, which can be hydrogenated or partially hydrogenated, may also be used. By present preference, a dairy fat is the fat source used. Illustrative dairy fat sources include, but are not limited to, anhydrous milk fat (AMF), concentrated milk fat (CMF), cream, and the like. It is possible to include other fat-containing dairy materials, such as dry cream, along with or as the fat source. The specific fat source used will also play a role in determining the characteristics flavors and aromas in the resulting cream cheese product. Preferably, the cheese products of this invention include only proteins derived from polymerized whey protein and milkfat. As those skilled in art know, the milk or dairy product composition may be varied, for example, by using fat from one or more milk sources, including no-fat or skim milk, low-fat milk, full-fat or whole milk, whole milk with added fat, and the like. The milk or dairy product composition may also be varied, for example, by inclusion of additional dairy components such as milk solids, cream, and the like. In this fat-containing mixture, the concentration of the polymerized whey protein from the WPC can be in a range of about 3 to about 8 percent, preferably about 4 to about 6 percent, based on the weight of the mixture. This fat-containing mixture is heated to a temperature m the range of about 55 to about 75° C., preferably about 60 to about 65° C. The heated fat-containing mixture is homogenized. Homogenization may be at a pressure up to about 14,500 psi, generally from about 1,500 to about 14,500 psi. Preferably the homogenization pressure is about 1,500 to about 10,000 psi, and more preferably about 3,000 to about 5,000 psi. The homogenization can be, and preferably is, conducted concurrently with the heating. The use of heating during homogenization is helpful in maintaining the milk fat in a liquid treatment, thereby increasing the efficiency of the homogenization step. In most cases, only a single pass through the homogenizer, especially when used with heating, is required. Homogenization reduces the average particle size in the mixture (oil/water); generally the average particle size is less than about 2.5 µm, and preferably less than about 1.5 µm. Suitable homogenizers that can be employed for this purpose are well-known in the fields of dairy science and food chemistry.

A two-stage homogenizer is preferred. All homogenization pressures specified hereafter refer to the first stage homogenization unless otherwise indicated. For cream cheese products, the pressure is preferably less than about 10,000 psi. A higher homogenization pressure (generally up to about 14,500 psi) can be used to achieve a thicker product. Softer and creamer products can be obtained using lower or more moderate homogenization pressures (generally about 3,000 to about 3500 psi). As will be appreciated, typically, flow rate and valve settings are adjusted to achieve the desired results herein; the homogenization pressure varied as needed to achieve the desired consistency of the final product.

The homogenized mixture can, if desired, be pasteurized. The current invention includes a fermentation step. The homogenized mixture should be cooled to a temperature suitable for inoculation and fermentation (e.g., ambient temperatures) using suitable cooling techniques and equipment known to those skilled in the art. The cooled homogenized mixture is inoculated with a suitable culture and allowed to ferment under conditions appropriate for forming curds and the whey. In principle, any lactic acid-producing bacteria used in conventional cheese making can be used in th process of the current invention. Suitable lactic acid-producing bacteria include, for example, Streptococcus or Leuconostoc such as *Streptococcus lactis, Streptococcus cremoris, Streptococcus diacetyllactis, Leuconostoc cremoris, Betacoccus cremoris*, and the like. These, lactic acid-producing bacteria can be used alone or in combination thereof. Not to be limited by theory, as is known in the art, lactic acid-producing microbes are used in cheese manufacturing to ferment lactose present in the dairy liquid and to cause further decomposition of the clotted casein into smaller peptides and free amino acids as a result of the culture's production of proteases and peptidases. The lactic acid-producing culture may be added in amounts which are conventional for the present purpose (i.e., typically about 10,000 to 100,000 bacteria/g of dairy liquid). The cultures can be added as freeze-dried, frozen, or liquid cultures. If appropriate, an additional acidifying agent, such as a lactic acid solution, may be added to bring the pH within the final target range. For cream cheese production, preferably cultures include lactic cultures, such as *Lactococcus cremoris* (commercially available from CHR Hansen, Milwaukee, Wis.) and the like. Fermentation is conducted using conventional techniques and procedures as well known in the art. For example, fermentation can be carried out at about 10 to about 40° C. for about 1 to about 36 hours, preferably at about 20 to about 25° C. for about 15 to about 24 hours. Fermentation can, if desired, be terminated by a brief exposure to an elevated temperature that inactivates the culture.

After fermentation, the product is mixed, such as with a stirring apparatus, and the pH can, if desired, be monitored to ensure the fermented product has a mildly acid pH, such in a range of about 4.7 to about 5.0. If the pH is too low, the pH can be adjusted by adding appropriate amounts of a basic compound, such as NaOH, that is acceptable in the manufacture of food products. It will be appreciated that in large batch or semi-continuous production that the present process parameters, such as temperature and pH, can be monitored as needed consistent with good manufacturing practice.

The fermented product is, optionally, salted with a suitable salt such as NaCl, KCl, and the like. Preferably, NaCl is used. Generally, the salt is added at a level of about 0.5 to about 1 percent, depending on the taste profile desired.

It is preferred to add one or more selected stabilizers (food grade hydrocolloids such as gums, starches, maltodextrins, and the like or texture modifiers such as emulsifiers and the like) to the fermented product. The stabilizer or stabilizers may be added with or without the salt. Generally, the amount of stabilizer or stabilizers added is less than about 4 percent; preferably, the amount of stabilizer or stabilizers added is about 0.1 to about 0.5 percent. The current Federal Standards of Identity can be taken into account in determining the level of added stabilizer; levels outside of the Federal Standards of Identity can be added if desired, however. Examples of suitable stabilizers include, but are not limited to, ionic or non-inoic gums such as locust bean gum, guar gum, tara gum, konjac gum, xanthan gum, carrageenan, and the like; cellulose derivatives such as carboxymethylcellulose; starches such as corn starch, waxy maize starch, rice starch, potato starch, tapioca starch, wheat starch; and modified starches such as phosphorylated starch. Instant and pregelatinized starches can be used, if desired. Other exemplary ionic gums include gellan, low methoxy pectin, and alginate. In one preferred embodiment, xanthan gum is used due to its cold water solubility, consistent composition, availability, and low cost. For a traditional cream cheese product, locust bean gum can be used. It will be appreciated that one of more dextrins, such as one or more maltodextrins, can be included in an amount of up to about 4 percent. Maltodextrin(s) is preferably added along with a gum to enhance stability and mouth feel for a cream cheese type product. Suitable maltodextrins include those having a dextrose equivalence (DE) of about 2 to about 10; C*deLight® commercial maltodextrin (DE about 3) from Cerestar is illustrative. It is possible to increase the initial and aged yield stress of a product by including at least one selected maltodextrin as a stabilizer in addition to a hydrocolloid gum stabilizer. Suitable gum stabilizers are described in Glicksman, Gum Technology in the Food Industry (1969 Academic Press) and in Davidson, Handbook of water-soluble gums and resins (1992 McGraw-Hill Book, Inc.).

Other texture modifiers may be added singly or in combination and include, for instance, emulsifiers. Generally, ionic, high hydrophillic lipophilic balance (HLB) emulsifiers are suitable; examples sodium stearoyl lactylate, calcium stearoyl lactylate, diacetyl tartaric acid esters, and the like. Other non-ionic emulsifiers can, if desired, be used, including monoglycerol esters of fatty acids and the like. Still other suitable emulsifiers include fatty acid esters of sucrose, fatty acid esters of propylene glycol, fatty acid esters of sorbitol, and polysorbate 60.

After adding the gum(s) and salt(s), the material is cooked at a temperature sufficient to dissolve the added gum or other stabilizer, but insufficient to induce significant a Maillard reaction. The cooking can be conducted in a suitable cooking-mixing apparatus until the desired temperature is reached. Generally, the cooking is carried out at about 70 to about 105° C. (preferably about 80 to about 85° C.) for about 0.5 to about 180 minutes (preferably for about 15 to about 45 minutes). Cooking temperature conditions that induce significant Maillard reactions should be avoided.

The cooked product is then homogenized to obtain a creamy texture and/or mouthfeel appropriate for the type of cheese desired (usually a cream cheese). The homogenization is generally carried out at about 1500 to about 5000 psi and preferably at about 2500 to about 3000 psi. The homogenization can be conducted using a single or multi-stage homogenizer. The resulting homogenized product is cheese-type product, preferably a cream cheese product, having significantly reduced levels of casein or, more preferably, essentially no casein. It can, if desired, be stored or packaged using conventional techniques. Conventional additives, such as vitamins, flavorings, colorants, preservatives and the like, can be included.

The use of the polymerized whey proteins from WPC unexpectedly and significantly increase (in some cases almost doubling) the firmness of the cream cheese product compared to a cream cheese product at the same protein concentration made using unpolymerized WPC (i.e., control prepared under similar conditions). The inventive cream cheese products of the present invention generally had yield stress values greater than about 2500 (and more preferably about 2600 to about 3800 Pascals); conventional cream cheese normally have yield stress values about 1400 to about 2000 Pascals.

The following examples describe and illustrate the processes and products of the invention. These examples are intended to be merely illustrative of the present invention, and not limiting thereof in either scope or spirit. Those skilled in the art will readily understand that variations in the materials, conditions, and process steps described in these examples can be used. Unless noted otherwise, all percentages in the present specification are by weight. All references cited herein are incorporated by reference in their entirety.

EXAMPLE 1

Preparation of Whey Protein Polymers

This examples illustrates the preparation of polymerized whey protein using a single-heating polymerization step. A sodium citrate solution was prepared and divided into two portions. A whey protein concentrate (WPC 34, Wisconsin Whey International, Juda, Wis.) was hydrated in one portion of the sodium citrate solution (80 percent of the total solution). The pH was adjusted to 8 using 1N NaOH after which the remainder of the sodium citrate solution was added to obtain a solution (total solution was 400 grams). Several solutions were prepared having different citrate levels as indicated in the Table below. The solutions were poured into individual containers, covered with aluminum foil, and heated at 90° C. for various times as also indicated in the Table below in order to effect polymerization. Time zero was taken when the center of each beaker reached 80° C. The beakers and their contents were stored overnight at room temperature. The resulting slurries were used in Example 2.

| Sample | Protein (%) | Citrate (mM) | Heating Time (min) |
|---|---|---|---|
| 1 | 5.1 | 0.5 | 60 |
| 2 | 6.0 | 0.5 | 30 |
| 3 | 5.5 | 0.75 | 45 |
| 4 | 5.1 | 0.5 | 30 |

-continued

| Sample | Protein (%) | Citrate (mM) | Heating Time (min) |
|---|---|---|---|
| 5 | 5.1 | 1.0 | 60 |
| 6 | 6.0 | 2.0 | 45 |
| 7 | 8.3* | 1.0 | 30 |
| 8 | 5.1 | 0.5 | 10 |
| 9 | 5.1 | 0.5 | 20 |
| 10 | 5.1 | 0 | 30 |
| 11 | 6.0 | 0.5 | 10 |

*demineralized WPC

EXAMPLE 2

Preparation of Cream Cheese Products

Cream cheese products were formulated to a target 4 percent protein level using the polymerized whey proteins of Example 1 with the following general formulation:

| Ingredient | Amount (%) |
|---|---|
| Polymerized Whey Protein (dry basis) | ? |
| Anhydrous Milkfat | 21.5 |
| NaCl | 0.7 |
| Locust Bean Gum | 0.25 |
| Water (total) | 65.9 |

The whey polymers of Example 1, anhydrous milkfat, and water were mixed together and then transferred to a Stephen mixer attached to a recirculating oil bath at a temperature of 110° C. The material was mixed at the lowest speed until the temperature reached 60° C. (about 6 to about 8 minutes). The mixture was then homogenized at 3000 psi followed by a second heating in the Stephan mixer to a temperature of 81° C., which took approximately 20 minutes. Once the mixture reached 81° C., it was poured into a stainless steel bowl and cooled to 22° C. in an ice bath. After the product was cooled, it was inoculated using a starter culture (CH—N 120 brand lactic culture from Christian Hansen, Milwaukee, Wis.). The culture was prepared by a 1:1 dilution of the frozen culture in sterile phosphate buffer. The amount of culture was based on 0.05 percent of the total weight and then doubled due to the dilution. After inoculation, the material was stored overnight in a 30° C. incubator to aid in acid production. The product was then stirred in a Hobart mixer at speed 1 for 1 minute and then the pH was measured. The pH was typically about 4.7 to about 5.0.

Sodium chloride and locust bean gum were then added with mixing. The resulting composition was then until a temperature of 85° C. was reached (after about 24 minutes) followed by homogenization at 3000 psi. The resulting cream cheese was then packaging into 8 ounce cups and stored at refrigeration temperature. The yield stress (firmness) was measured after one week of storage at about 6° C.; the results are reported in the Table below.

| Sample | Yield Stress (Pa) |
|---|---|
| 1 | 3625 |
| 2 | 3073 |

-continued

| Sample | Yield Stress (Pa) |
|---|---|
| 3 | 2607 |
| 4 | 3495 |
| 5 | 3255 |
| 6 | 2638 |
| 7 | 2303 |
| 8 | 3733 |
| 9 | 3715 |
| 10 | 3557 |
| 11 | 3786 |

For comparison purposes, the yield stress of a convention cream cheese prepared in essentially the same manner except for the use of the whey protein of Example 1 is expected to have a value significantly less than 2500 Pa.

The use of this single-heat treatment to effect polymerization of proteins from a WPC leads to a protein polymer composition that can be used in manufacturing a cream cheese product manifesting an unexpected improvement in firmness compared to control products. At bench scale, cream cheese products made using the whey protein polymerization step had a yield stress values between about 2300 pascals and about 3700 pascals depending on the conditions of polymerization. Control cream cheese products made from respective corresponding whey protein that had not undergone the single-heating polymerization step had yield stress values dramatically less (generally about 40 to 50 percent less).

What is claimed is:

1. A method for producing a cream cheese product having significantly reduced levels of casein, said method comprising:
   (i) preparing an aqueous suspension having a protein concentration of about 5 to about 20 percent from water and a whey protein concentrate;
   adjusting the pH of the aqueous suspension, if necessary, to a pH of about 7 to about 9; and
   heating the aqueous suspension in a single heat treatment step to a temperature of about 70 to about 95° C. for a time sufficient to obtain a polymerized whey protein having about 30 to about 85 percent disulfide crosslinking; and
   optionally cooling the aqueous suspension containing the polymerized whey protein; and
   (ii) mixing at least a portion of the aqueous suspension containing the polymerized whey protein from (i), water, and milkfat to obtain a mixture;
   (iii) heating the mixture to a temperature of about 55 to about 75° C. to liquify the milkfat at;
   (iv) homogenizing the mixture from (iii) at about 1,500 psi to about 5,000 psi to form a homogenized mixture;
   (v) optionally pasteurizing the homogenized mixture;
   (vi) cooling the homogenized mixture of step (iv) or the optionally pasteurized mixture of step (v) to approximately ambient temperature;
   (vii) inoculating the mixture with a lactic culture and fermenting the inoculated mixture to obtain a fermented mixture;
   (viii) mixing a stabilizer and optionally a salt with the fermented mixture and cooking at a temperature of about 70 to about 105° C. to obtain a cooked material; and
   (ix) homogenizing the cooked material to obtain the cream cheese product having significantly reduced levels of casein.

2. The method according to claim 1, wherein cream cheese product has essentially no casein.

3. The method according to claim 2, wherein the protein concentration of the aqueous suspension is about 5 to about 6 percent.

4. The method according to claim 3, wherein the pH of the aqueous suspension is about 7.2 to about 8.0.

5. The method according to claim 4, wherein mixture in step (iv) is homogenized at about 3,000 psi to about 5,000 psi.

6. The method according to claim 5, wherein the aqueous suspension 10 in step (i) is heated for about 10 minutes to about 60 minutes.

7. The method according to claim 2, wherein the stabilizer is selected from the group consisting of food grade hydrocolloids and texture modifiers.

8. The method according to claim 7, wherein the food grade hydrocolloids are gums, starches, or maltodextrins, and texture modifiers are emulsifiers.

9. The method according to claim 1, wherein the temperature in step (viii) is about 80 to 95° C.

10. The method according to claim 1, wherein the cooking in step (viii) is conducted for about 5 to 60 minutes.

11. The method according to claim 10, wherein the cooking in step (viii) is conducted for about 10 to about 30 minutes.

12. The method according to claim 1, wherein a salt is added in step (viii).

13. The method according to claim 12, wherein the salt is selected from the group consisting of sodium chloride and potassium chloride.

14. The method according to claim 1, wherein the homogenizing in step (ix) is conducted at a pressure of about 1,500 to about 5,000 psi.

15. The method according to claim 14, wherein the homogenizing in step (ix) is about 2500 to about 3000 psi.

16. The method according to claim 2, wherein the stabilizer is selected from the group consisting of food grade hydrocolloids and texture modifiers.

17. The method according to claim 16, wherein the food grade hydrocolloids are gums, starches, or maltodextrins, and texture modifiers are emulsifiers.

18. A cream cheese product having significantly reduced levels of casein, said cream cheese product being obtained by a method comprising:
   (i) preparing an aqueous suspension having a protein concentration of about 5 to about 20 percent from water and a whey protein concentrate;
   adjusting the pH of the aqueous suspension, if necessary, to a pH of about 7 to about 9; and
   heating the aqueous suspension in a single heat treatment step to a temperature of about 70 to about 95° C. for a time sufficient to obtain a polymerized whey protein having about 30 to about 85 percent disulfide crosslinking; and
   optionally cooling the aqueous suspension containing the polymerized whey protein; and
   (ii) mixing at least a portion of the aqueous suspension containing the polymerized whey protein from (i), water, and milkfat to obtain a mixture;
   (iii) heating the mixture to a temperature of about 55 to about 75° C. to liquify the milkfat at;

(iv) homogenizing the mixture from (iii) at about 1,500 psi to about 5,000 psi to form a homogenized mixture;

(v) optionally pasteurizing the homogenized mixture;

(vi) cooling the homogenized mixture of step (iv) or the optionally pasteurized mixture of step (v) to approximately ambient temperature;

(vii) inoculating the mixture with a lactic culture and fermenting the inoculated mixture to obtain a fermented mixture;

(viii) mixing a stabilizer and optionally a salt with the fermented mixture and cooking at a temperature of about 70 to about 105° C. to obtain a cooked material; and (ix) homogenizing the cooked material to obtain the cream cheese product having significantly reduced levels of casein.

* * * * *

UNITED STATES PATENT AND TRADEMARK OFFICE
CERTIFICATE OF CORRECTION

PATENT NO. : 7,250,183 B2
APPLICATION NO. : 10/748626
DATED : July 31, 2007
INVENTOR(S) : Lindstrom et al.

It is certified that error appears in the above-identified patent and that said Letters Patent is hereby corrected as shown below:

In col. 11, line 51, claim 1, after "milkfat" delete "at".

In col. 12, line 13, claim 6, after "suspension", delete "10".

In col. 12, line 67, claim 18, after "milkfat" delete "at".

Signed and Sealed this

Thirtieth Day of October, 2007

JON W. DUDAS
*Director of the United States Patent and Trademark Office*